United States Patent
Licht et al.

(10) Patent No.: US 12,134,685 B2
(45) Date of Patent: Nov. 5, 2024

(54) APPARATUS, SYSTEM AND METHOD FOR MAKING A POLYMER-CARBON NANOMATERIAL ADMIXTURE FROM CARBON DIOXIDE AND MATERIALS AND PRODUCTS THEREOF

(71) Applicant: Direct Air Capture, LLC, Venice, FL (US)

(72) Inventors: Stuart Licht, Venice, FL (US); Gad Licht, Venice, FL (US)

(73) Assignee: DIRECT AIR CAPTURE, LLC, Venice, FL (US)

( * ) Notice: Subject to any disclaimer, the term of this patent is extended or adjusted under 35 U.S.C. 154(b) by 0 days.

(21) Appl. No.: 18/410,579

(22) Filed: Jan. 11, 2024

(65) Prior Publication Data

US 2024/0199843 A1    Jun. 20, 2024

Related U.S. Application Data (63) Continuation of application No. 17/752,494, filed on May 24, 2022, now Pat. No. 11,905,386.

(60) Provisional application No. 63/192,304, filed on May 24, 2021.

(51) Int. Cl.
| | |
|---|---|
| *C08K 3/04* | (2006.01) |
| *B82Y 30/00* | (2011.01) |
| *B82Y 40/00* | (2011.01) |
| *C08L 67/03* | (2006.01) |
| *C25B 1/01* | (2021.01) |
| *C25B 15/08* | (2006.01) |

(52) U.S. Cl.
CPC ............. *C08K 3/041* (2017.05); *B82Y 30/00* (2013.01); *B82Y 40/00* (2013.01); *C08L 67/03* (2013.01); *C25B 1/01* (2021.01); *C25B 15/08* (2013.01); *C08K 2201/011* (2013.01)

(58) Field of Classification Search
CPC ..... C08K 3/041; C08K 2201/011; C25B 1/01; C25B 15/08; B82Y 30/00; B82Y 40/00; C08L 67/03
USPC ......................................................... 524/424
See application file for complete search history.

(56) References Cited

U.S. PATENT DOCUMENTS

2020/0149173 A1     5/2020  Licht et al.

FOREIGN PATENT DOCUMENTS

WO      WO-2020092449 A1 *   5/2020   ............. C01B 32/10

OTHER PUBLICATIONS

International Search Report mailed Nov. 8, 2022, issued in corresponding PCT Application No. PCT/US2022/030682.
(Continued)

*Primary Examiner* — Ling Siu Choi
*Assistant Examiner* — Ronald Grinsted
(74) *Attorney, Agent, or Firm* — Chamberlain, Hrdlicka, White, Williams & Aughtry; Aly Dossa (57) ABSTRACT

Embodiments of the present disclosure relate to an apparatus, system and method for making an admixture of a polymer and carbon nanomaterials (CNM). The admixture of such embodiments comprise about 10% or less by weight (wt %) of CNMs. The CNM content of such admixture may impart new or enhanced properties to the admix and to materials and products made therefrom. Such new or enhanced products may include enhanced tensile strength, new or enhanced electronic medical, structural thermal, catalytic properties or any combination thereof.

16 Claims, 6 Drawing Sheets

(56) References Cited

OTHER PUBLICATIONS

Written Opinion of the International Searching Authority mailed Nov. 8, 2022, issued in corresponding PCT Application No. PCT/US2022/030682.
Zhang Hui et al, "Aligned carbon nanotube/polymer composite film with anisotropic tribological behavior", Journal of Colloid and Interface Science, Academic Press, Inc., vol. 395, Dec. 19, 2012, XP028985357, pp. 322-325.

* cited by examiner

APPARATUS, SYSTEM AND METHOD FOR MAKING A POLYMER-CARBON NANOMATERIAL ADMIXTURE FROM CARBON DIOXIDE AND MATERIALS AND PRODUCTS THEREOF

CROSS-REFERENCE TO RELATED APPLICATIONS

This application is a continuation of U.S. patent application Ser. No. 17/752,494, filed May 24, 2022, which claims priority to and the benefit of U.S. Provisional Patent Application Ser. No. 63/192,304 filed on May 24, 2021, which is hereby incorporated herein by reference in its entirety.

TECHNICAL FIELD

The present disclosure relates to manufacturing a product using an electrolysis process. In particular, the present disclosure relates to a system for making a carbanogel admixture product from carbon dioxide that is split using the electrolysis process.

BACKGROUND

As of 2015, annual plastics production can be summarized as: polypropylene (PP) with 68 megatons (MT) of non-fiber PP produced and 52 MT of fiber PP produced; polyethylene (PE) with 64 MT of low-density PE produced and 52 MT of high-density PE produced; polyester, which is also called polyethylene terephthalate (PET), with 33 MT produced annually; and, polyvinyl chloride (PVC) with 38 MT produced annually. The magnitude of production of other plastics drops dramatically compared to that of PVC.

During plastics production, polymerization of monomers to form a polymer occurs by reactions such as: condensation reactions, ring opening reactions, ionic reactions, chain transfer reactions or plasma polymerization reactions. Polymers are often differentiated as natural polymers, synthetic polymers, semisynthetic polymers, regenerated polymers, amorphous polymers, semi-crystalline polymers, thermoplastics or thermoset plastics.

The main advantages of PP and PE production are the low cost and providing a plastic with desirable mechanical flexibility. PP and PE are made from gases at high temperature and high pressure with a special catalyst. PP and PE are a challenge to recycle and they are chemically resistant plastics, which can result in PP and PE lingering in the environment and exacerbating plastic pollution.

PVC is usually made with cooling, an initiator, one or more additives to help suspend small PVC particles in water. The aqueous suspension is then dried and melted together. Sometimes the PVC particles are first produced and then mixed with plasticizers, or other additives in a slurry. This polymerization reaction doesn't make anything beyond PVC. Typically, plasticizers and carbonates are added to increase PVC strength, flexibility, and the rate and ease of PVC production.

Thermoplastics are often associated with materials requiring rigidity. Thermoplastics can be melted by heat and cooled to re-solidify and formed to take various forms via molding, compression molding, machining or by a 3D printer application. Polylactic acid (PLA) is one example of a thermoplastic that is recyclable, can be bio-sourced and sometimes biodegraded. PLA is relatively easy to make, by a simple heating, and produces water as co-product. PLA's main limitation is its lower strength properties. Plasticizers are often used as an additive to increase desirable properties in PLA, including polycarboxylate (or polycarboxylate salts), or citric acid which has many carboxylate groups.

The annual production (2019) of PLA was only 0.2 MT, but has one of highest annual production rates of growth (26%) creating a demand that exceeds supply and prices are rising. As a thermoplastic, PLA is a polymer that can be melted by heat and cooled and formed, which is a property shared with all thermoplastics including, not limited to: PE, PP, PVC, acrylic, acrylonitrile butadiene styrene or ABS, nylon, Teflon and polycarbonate or PC. ABS is a plastic commonly used in 3D printing applications and it also used in vehicle bodies, appliances, and phone cases.

In contrast, thermoset plastics are irreversibly cured via crosslinking into a permanent solid state and are formed by chemical reactions. For example, thermoset plastics can also be used printed in 3D printing applications, but only via chemical reactions such as, but not limited to, photopolymerization or thermal chemical reactions. Prior to curing, thermoset plastic pre-cure component or components are available as liquid, which are often viscous or dense. Thermoset plastics are often resistant to higher temperatures and tend to decompose, rather than melt, at high temperatures. Common examples of thermoset plastics include epoxies (and epoxy resins), acrylics, phenolics, silicone (polysiloxanes), polyurethane (PU), polyimide, vulcanized rubber, Bakelite (polyoxybenzylmethylenglycolanhydride), polydicyclopentadiene (pDCPD), polyisocyanurate, polyester, polyurea, urea-formaldehyde, and vinyl ester, cyanate, melamine, or polyester resins.

Carbon nanomaterials (CNM) including carbon nanotubes (CNT) have been added to plastics to form admixtures, also referred to as an admix herein, and composite materials and products can be made from such admixes. Historically, PVC-CNT and PLA-CNT admixes were made by either dissolving plastic in solvent and dispersing CNTs therein by sonication, then drying out the admixture, or melting plastic beads mixed with CNTs.

Polymer-CNT admixtures have been studied using PLA, including printed PLA/CNT components, PVC, and other polymers including polyurethane, polystyrene, polyaniline, polyvinylidene fluoride and a wide range of epoxies. Graphene and graphene oxide polymer admixtures are also known.

Kevlar is neither a thermoset nor a thermoplastic as it is formed by spinning solutions of the polymer into fibers. Kevlar-CNT composites have been formed by coating Kevlar on CNTs and joining CNTs with repeat units of the polymer p-phenyleneterephtalamide (PPPA) and terephthaloyl chloride (TPC) covalently bound to the surface of the CNTs. Kevlar-CNT admixes can considerably increase their impact resistance. Compared to no added CNT, adding 0.1 weight percent (wt %) CNT caused a 6.5 times increase in the normalized absorbed energy.

While it is known to combine CNMs and polymers for imparting a number of new and enhanced properties of the resultant material or product, the use and deployment of such resultant materials and products has not been widespread. Without being bound by any particular theory, this hampered use and deployment may be due to the common ways of making the CNM component, which has an associated high cost and an associated high carbon-footprint. For example, chemical vapor deposition (CVD) is a process that is conventionally used in the commercial production of CNMs. CVD is expensive and, currently, the price of CNMs such as CNTs, graphene and carbon nano-onion are in the range of $0.1 to $10 million per tonne. Comparatively, steel is priced at $400 to $700 per tonne.

As such, new approaches for commercial production of polymer-CNM admixes and the materials and products made therefrom that address the high costs and the associated high carbon-footprint are desirable.

SUMMARY

Embodiments of the present disclosure relate to a polymer-carbon nanomaterial (CNM) admixture that can be used to make materials or products that have new or enhanced properties as compared to materials or products made from polymer alone.

Some embodiments of the present disclosure relate to a polymer-CNM admix that comprises a carbanogel; and a polymer mix.

Some embodiments of the present disclosure relate to a system for making a polymer-CNM admixture. The system comprises an apparatus for performing an electrolysis process that splits carbon dioxide ($CO_2$) within a molten electrolyte for producing a carbanogel, wherein the carbanogel comprises carbon nanomaterials (CNM) and electrolyte; a vessel for receiving the carbanogel; and a source of a polymer mixture.

The deployment of polymer-CNMs admixes and the resultant composite materials has been hampered by the high costs of making the CNM component the associated high carbon-footprint. Furthermore, there are technical challenges to establish an even dispersion of CNMs throughout the admix, particularly when there are lower amounts of CNM present.

It is known that the high production cost of CNMs is predominantly due to high reactant and energy costs. Without being bound by any particular theory, these production costs can be lowered by two orders of magnitude when produced from $CO_2$ by a molten electrolysis process and the produced CNMs can be used as a component in a polymer-CNM admixture, in accordance with the embodiments of the present disclosure. Furthermore, and without being bound by any particular theory, a carbanogel produced by the electrolytic process may also assist with overcoming the challenge of establishing an even dispersion of CNMs throughout the admix by the carbanogel providing a lattice-like structure that may provide a fixed and dispersed position of the CNM.

BRIEF DESCRIPTION OF THE DRAWING

These and other features of the present disclosure will become more apparent in the following detailed description in which reference is made to the appended drawings.

FIG. 5 shows photographs of scanning electron microscope images of a carbanogel made according to the embodiments of the present disclosure, wherein FIG. 5A shows an image of ×730 magnification; and FIG. 5B shows an image of ×8600 magnification.

DETAILED DESCRIPTION

Embodiments of the present disclosure relate to an apparatus, system and method for making an admixture of a polymer and carbon nanomaterials (CNM). The admixture of such embodiments comprise about 10% or less by weight (wt %) of CNMs. The CNM content of such admixture may impart new or enhanced properties to the admix and to the materials and products made therefrom. Such new or enhanced properties include, but are not limited to: strength properties, electronic application properties, medical application properties, thermal conduction properties, thermal insulation properties, catalytic properties or any combination thereof.

Since 2009, the energy efficient conversion of $CO_2$ to carbon and oxidation by molten carbonate electrolysis has been known. Subsequently, the chemical conversion of $CO_2$ to a variety of graphitic carbon nanomaterials (CNMs) was demonstrated. These graphitic CNMs are valuable due to a long-term stability and these materials having useful properties such as ultra-high strength, high electrical conductivity, high thermal conductivity, new electronics, high battery, fuel cell and capacitor storage capacities, electromagnetic radiation shielding, effective drug delivery and various medical properties, and useful catalysis properties.

$$CO_2 \rightarrow C_{nanomaterials} + O_2 \quad \text{(EQN. 1)}$$

EQN. 1 demonstrates a molten electrolysis process whereby the carbon nanomaterials grow and remain on the cathode as a mix of tangled CNMs mixed with electrolyte. This mixture has been termed a carbanogel, and at least 95% of the electrolyte can be pressed out of this carbanogel by high-temperature press filtration.

Inclusion of $sp^2$ bonded carbon components of graphene and the single or multiple layered graphene, which can occur within a CNM component may provide the CNMs within a carbanogel enhanced properties such as, but not limited to, increased strength and conductivity of these CNMs. Additionally, the relative amount of a specific morphology of the CNM may impart additional properties into the carbanogel and products made therefrom. Examples of such morphologies include, but are not limited to: as spherical nanocarbon, solid and hollow nano-onions, nanocarbon of cylindrical allotropes, planar allotropes, helical allotropes, carbon nanotubes (CNTs), nanofibers, graphene, nano-platelets, nano-scaffolds, nano-trees, nano-belts, nano-flowers, nano-dragon, nano-trees, nano-rods, surface modified or metal coated CNMs, amorphous nanocarbon without graphitic characteristics or properties, or any combination thereof. Examples of such additional properties include, but are not limited to: reduced friction, resiliency, thermal conductance, flame resistance, chirality, enhanced surface area of the CNMs within the carbanogel or any combination thereof. These properties are useful for specific applications, including, but not limited to: lubrication, flexible materials, chiral light absorption, chiral light emission, chiral catalysis, improved electrochemical charge storage, enhanced catalytic activity, fire resistance, or enhanced EMF shielding capabilities. The CNMs within the carbanogel may also include additional features including doping, magnetism, unusual shapes and diminished or enlarged size. Without being limited by any theory, CNTs can include single walled CNTs; multi-walled CNTs; doped CNTs, such as boron, sulfur, phosphorous or nitrogen doped CNTs; magnetic CNTs; bamboo shaped CNTs; pearl shaped CNTs; isotope specific CNTs, such as $^{12}C$ and $^{13}C$ CNTs; surface modified or metal coated CNTs; helical CNTs, including single or double braided CNTs; spiral helical CNTs; thin, thick or solid walled CNTs; thin or thick diameter CNTs; short or wool (long) CNTs, or any combination thereof.

According to the embodiments of the present disclosure, a carbon-containing gas can be subjected to an electrolysis process, also referred to herein as the electrosynthesis process, for generating a carbanogel that contains a carbon nanomaterial (CNM) product from the carbon within the gas. The term "carbanogel" is used herein to refer to a mixture of CNM and electrolyte that is a product of the electrolysis process and is localized on the cathode during and after the electrolysis process. The terms "carbon nanomaterial product" and "CNM product" are used herein to refer to a collection of nanocarbon, which may also be referred to as nano-scaled carbon, of one or more morphologies. The term "nanocarbon" is used herein to refer to carbon that is arranged into specific structures, such as graphitic nanocarbon structures, within the nanoscale. In particular, the carbon from the carbon-containing gas can be split into carbon and oxygen using a molten electrolyte media and a variety of electrolysis process configurations. The electrolysis process can cause a mass transfer of carbon from a gas phase into the molten electrolyte media, the solid CNM product or both. The CNM product can be a substantially pure, pure, or impure, carbon nanomaterials (CNMs) including carbon nanotubes (CNTs). The CNM product may comprise one or more morphologies of CNM structures, as described herein above or any combination thereof. Optionally, one or more parameters of the electrolysis process may be adjusted in order to change the relative amount of a given morphology within the CNM product.

Figure 1:
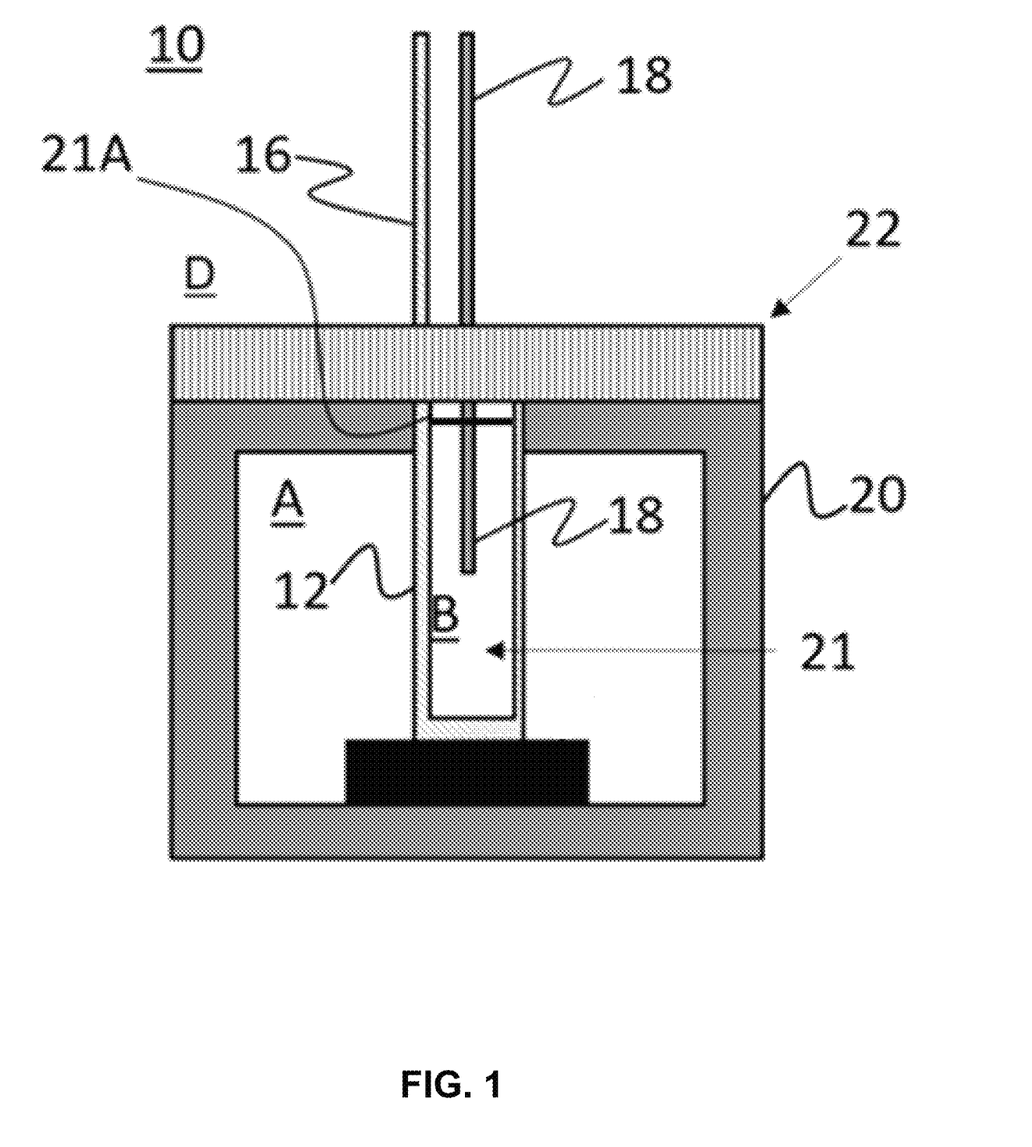
FIG. 1 is a schematic of an apparatus for making a carbanogel product, for use in embodiments of the present disclosure.

As shown in FIG. 1, the electrolysis process may occur within an apparatus 10 that comprises a case 12, which may also be referred to as an electrolysis chamber or electrolysis cell, for housing a cathode 18, where an anode 16 may form at least a portion of an inner surface of a wall of the case 12. Together the two electrodes define an electrolysis space therebetween. As will be appreciated by those skilled in the art, optionally the anode 16 may be separate from the wall of the case 12. The case 12 is configured to house an electrolyte media 21. The electrolysis space B, including an upper surface 21A of the electrolyte, may be in fluid communication with a source of the carbon-containing gas (shown as D in FIG. 1). In some embodiments of the present disclosure, the case 12 may be contained within an insulated housing 20 that is made of a thermal insulator material. The insulated housing 20 may also include a top 22, or sides or bottom (not shown) that is made of a thermal insulator material or not, and the thermal insulator may be from $CO_2$ permeable thermal insulator such as high temperature woven ceramics, or largely $CO_2$ impermeable thermal insulators. Examples of the permeable thermal insulator including, but are not limited to, Morgan Cerablanket®, made from oxides of alumina and silica and may include zirconia, and Morgan Superwool® made from alkaline earth silicates, both rated for temperatures in excess of 1,200° C. Examples of largely $CO_2$ impermeable thermal insulator include the wide range of available commercial firebricks or poured refractory cement and mortars, and examples of which include, but are not limited to: BNZ Materials firebricks and refractory cement and mortar such as PA 20 and 23, and BNZ 2000, 2300, 23A, 2600, 26-60, 2800, 3000 and 3200 rated for temperatures in excess of 1,090° C.

The source of the carbon-containing gas may be various industrial plants including but not limited to: cement manufacturing plants; iron refining plants; steel manufacturing plants; plants that make or use one or more of ammonia, ethanol, magnesium, hydrogen, polymers, plastics, glass; waste water treatment plants, food processing plants. The source of the carbon-containing gas may also be chemical reactors including internal combustion engines and combustion of carbonaceous materials for heating or cooking. Emission gases from a power generating plant, steam generation facility, or pyrolysis reactors may also be a source of the carbon-containing gas. A carbon-containing gas emitted from these sources or in the production of any high carbon-footprint substance may also contribute to or constitute a source of carbon for making a CNM product. In addition, a gas product of the combustion or transformation of fossil fuels for heating, transportation, and carbon products such as polymers and plastics can also contribute to or constitute a source of carbon for making a CNM product.

In some embodiments of the present disclosure, the anode 16 is formed as a planar structure, a wire structure, a screen, a porous structure, a conductive plate, a flat or folded shim, a coiled structure or the anode can form at least part of an inner side wall of the case 12. The anode 16 can be formed of various conductive materials so that the anode 16 may be oxygen generating or not. Such anode-forming materials include, but are not limited to: any conductive material that has a stable layer, or establishes, a highly stable oxide outer layer that is conducive to oxygen production during the electrolysis reactions performed according to the embodiments of the present disclosure, Ni, Ni alloys, galvanized (zinc coated) steel, titanium, graphite, iron, and a wide variety of metal which establish a highly stable oxide outer layer that is conducive to oxygen production. Further examples of suitable materials for forming the anode 16 include Nickel Alloy 36 (nickel without chromium, but with iron), Nichrome (nickel chromium-based alloys) including stainless steels such as SS 304 or SS 316, and inconel alloys, such as Inconel 600, 625, and 718, alloy C-264, or Nichromes such as Chromel A, B or, as the co-nucleation of the alloy components are known to produce high quality CNTs. Binary and ternary transition metal nucleation agents may also be useful that include, but are not limited to: Ni, Cr, Sn, In, Fe, and Mo can also affect CNM product growth.

In some embodiments of the present disclosure, a transition metal may be added on to the anode 16, which can be dissolved from the anode 16 to migrate through the electrolyte media 21 onto the cathode 18. The added transition metal can function as a nucleating agent, which may be selected from nickel, iron, cobalt, copper, titanium, chromium, manganese, zirconium, molybdenum, silver, cadmium, tin, ruthenium, zinc, antimony, vanadium tungsten, indium, gallium, or non-transition metals such as germanium or silicon, or a mixture thereof, including, but not limited to brass, Monel, and nickel alloys. The transition metal may also be introduced as a dissolved transition metal salt within the electrolyte media 21 directly to migrate onto the cathode 18. It is also possible to add the transition metal nucleating agent directly onto the cathode 18.

In some embodiments of the present disclosure, the cathode 18 is formed as a planar structure, a wire structure a screen, a porous structure, a conductive plate, a flat or folded shim, a sheet, a coiled structure or the cathode can form at least part of an inner side wall of the case 12. The cathode 18 can be formed of various conductive materials that reflect the need for variation of the nucleation point and the CNM product that forms on the cathode 18. Such cathode-forming materials include, but are not limited to: any conductive material, galvanized (zinc coated) steel, titanium, graphite, iron, an alloy that comprises copper and zinc, Monel (Ni 400, a Ni/Cu alloy), Inconel, stainless steel, iron, Nichrome, pure Cu, and brass alloys may also be suitable as materials for making the cathode 18.

The anode 16 and the cathode 18 may be aligned substantially parallel to each other within the case 12, such as a stainless steel case or a case made of substantially pure or pure alumina. The case 12 may be made of any material that is suitable to contain the molten electrolyte media 21 and to sustain the temperatures achieved by the apparatus 10A. The electrodes may be oriented in any orientation, including but not limited to substantially horizontally or substantially vertically, but spaced apart from each other so as to define the electrolysis space B therebetween. In some embodiments of the present disclosure, the electrolysis space B is between about 0.1 cm and about 10 cm. In some embodiments of the present disclosure, the electrolysis space B is about 1 cm. As will be appreciated by those skilled in the art, the dimensions of the electrolysis space B will be dictated by the scale of the apparatus 10, such as the size of each electrode, the plenum defined within the case, the amount of electric current applied and combinations thereof.

The anode 16 and the cathode 18 are operatively connected to a source of electric current (not shown), which can be any source of an alternating current or a direct current, either constant or not, that provides a current density of between about 0.001 A/cm2 and 10 A/cm2. In some embodiments of the present disclosure, the current density provided between the electrodes is at least 0.02 $A/cm^2$, 0.05$A/cm^2$, 0.1 $A/cm^2$, 0.2 $A/cm^2$, 0.3 $A/cm^2$, 0.4 $A/cm^2$, 0.5 $A/cm^2$, 0.6 $A/cm^2$, 0.7 $A/cm^2$, 0.8 $A/cm^2$, 0.9 $A/cm^2$, 1.0 $A/cm^2$ or greater. The power for the source of electric current may be any power source or combination of power sources, including electrical power sources, solar power sources and the like.

The source of heat (not shown) can be any source of heat that increases the temperature within the case 12 to a temperature that causes the electrolyte media 21 to transition to a molten phase. For example, the source of heat can achieve a temperature within the case 12 of between about 500° C. and about 850° C. or higher. In some embodiments of the present disclosure, the heating achieves a temperature between about 700° C. and about 800° C., between about 720° C. and about 790° C., or between about 750° C. and about 780° ° C. In some embodiments of the present disclosure, the heating achieves a temperature of 749-750° C., 751-752° C., 753-754° C., 755-756° C., 757-758° C., 759-760° C., 761-762° C., 763-764° C., 765-766° C., 767-768° C., 769-770° C., 771-772° C., 773-774° C., 775-776° C., 777-778° C., or 779-780° C. In some embodiments of the present disclosure, the temperature within the case 12 can be increased to about 800° C. or hotter. In some embodiments of the present disclosure, the source of heat is provided by, or is supplemented by, the exothermic reaction of CO2 absorption and conversion to carbonate (mass transfer from the gas phase to the solid phase CNM product), or an over potential of applied electrolysis current.

In some embodiments of the present disclosure, the electrolyte media may comprise a carbonate that can be heated by the heat source until it transitions to a molten phase. For example, the carbonate may be a lithium carbonate or lithiated carbonate. Molten carbonates, such as a lithium carbonate ($Li_2CO_3$), which has a melting point of 723° C., or lower melting point carbonates such as $LiBaCaCO_3$, having a melting point of 620° C., when containing oxide includes spontaneous oxide formation that occurs upon melting, or that is a result of electrolysis or when mixed with highly soluble oxides, such as $Li_2O$, $Na_2O$ and BaO, sustain rapid absorption of $CO_2$ from the space above the molten electrolyte media. Suitable carbonates may include alkali carbonates and alkali earth carbonates. Alkali carbonates may include lithium, sodium, potassium, rubidium, cesium, or francium carbonates, or mixtures thereof. Alkali earth carbonates may include beryllium, magnesium, calcium, strontium, barium, or radium carbonates, or mixtures thereof. In some embodiments of the present disclosure, the electrolyte can be a mixed composition for example, a mix of alkali carbonates and alkali earth carbonates and one or more of an oxide, a borate, a sulfate, a nitrate, a chloride, a chlorate or a phosphate.

According to the embodiments of the present disclosure, the carbanogels are formed by the molten carbonate electrolytic splitting of $CO_2$. The carbanogels comprise a mixture of a CNM network and electrolyte that remain after the electrolysis process is stopped. Interestingly, the carbanogel can retain the CNM network after processing, such as crushing. Furthermore, the electrolyte content of the carbanogel (processed or unprocessed) can be reduced by pressing, reacting or washing the electrolyte out. After removing some or all of the electrolyte, the carbanogel consists of CNMs composed of high purity carbon. After removing some or all of the electrolyte, the CNM may define internal voids. For example, the CNM may define void spaces within the CNM, upon the CNM surfaces and within the CNM or combinations thereof. For the purposes of this disclosure, the term "void" means a two or three-dimensional space within the CNM that is substantially free of electrolyte or other matter.

In some embodiments of the present disclosure, the voids defined within the CNM may be partially, substantially fully filled or completely filled with a void-filling agent, such as an application-based material. Examples of suitable void-filling agents include, but are not limited to: a strengthener, a catalyst, a dopant, a medicine or an electromagnetic field (EMF) shielding agents. Strengtheners can include, but are not limited to epoxies, resins and other polymers, cementitious materials and metals. Catalysts can include, but are not limited to materials to expedite chemical or electrochemical reactions. Dopants can include, but are not limited to materials that at low quantity within the voids materially affect the physical chemical properties of the polymer-CNM admix and materials and products made therefrom. The CNM components in the carbanogel can be aligned mechanically, electrically or magnetically to further enhance on or more properties of—or impart new properties to—the polymer-CNM admix and materials and products made therefrom. Such properties include, but are not limited to strength, electrical, and thermal properties. The electrical and/or magnetic alignment may be achieved with application of an orienting electrical and/or magnetic field during the carbanogel preparation stages. Magnetic CNMs are prepared by incorporating magnetic materials, such as metals or metal carbides during the electrolysis process when generating the CNM. The polymer-CNM admix may be used to form a sheet material that may be used alone, such as in liners, heat retardants, or shields, or in combination, such as but not limited to laminates, with other materials—that are not made with the polymer-CNM admix—to impart improved properties to those other materials.

It is known that the high production cost of CNMs is predominantly due to high reactant and energy costs. Without being bound by any particular theory, these production costs can be lowered by two orders of magnitude when produced from $CO_2$ using a molten electrolysis process according to the embodiments of the present disclosure.

Some embodiments of the present disclosure relate to a system 200 for making a polymer-CNM admix 222. As shown in the non-limiting example of FIG. 2, the system 200 comprises an apparatus 210 for performing an electrolysis process that splits carbon dioxide ($CO_2$) within a molten electrolyte for producing a carbanogel product, a vessel 212 and a source of a monomer/polymer mix 214. The system 200 may be used to perform the methods of the present disclosure, as described herein below.

Figure 2:
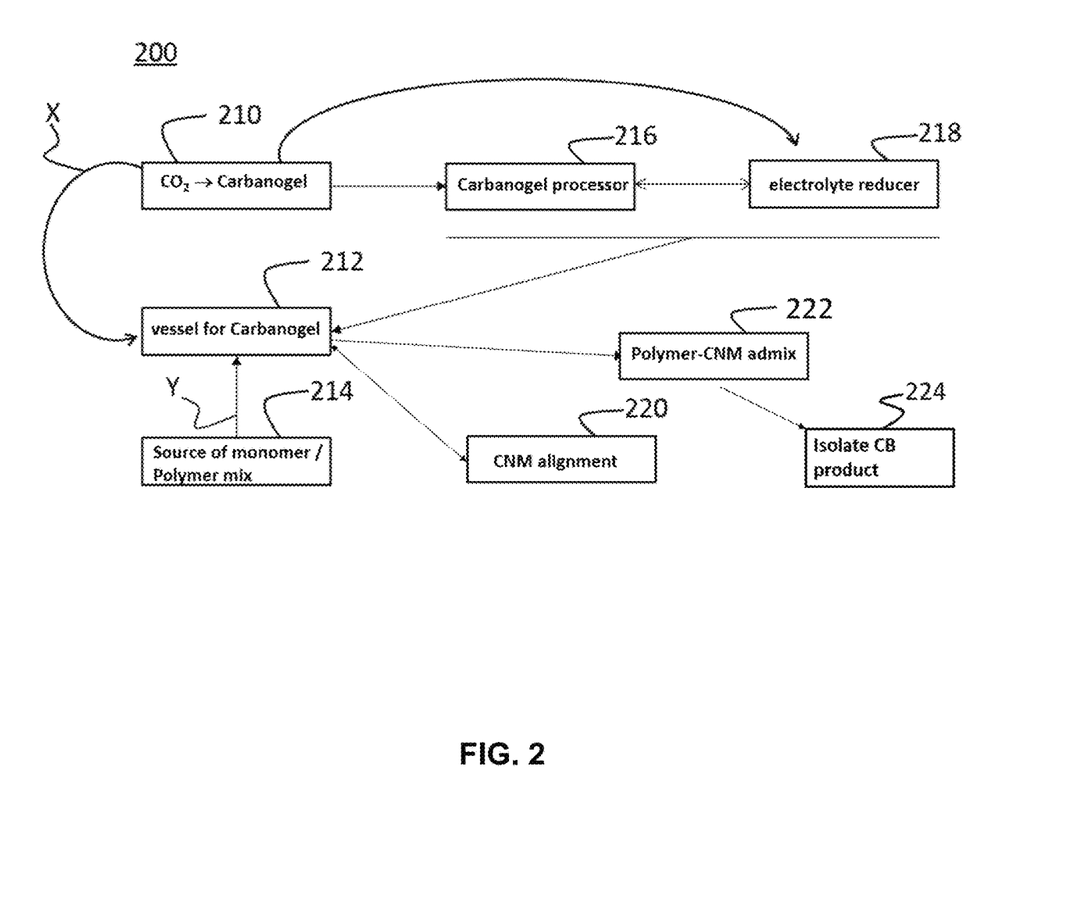
FIG. 2 is a schematic of a system, according to the embodiments of the present disclosure, for making a polymer-CNM admix.

In some embodiments of the present disclosure, the apparatus 210 may be the same or similar to the apparatus 10 described herein above. The apparatus 210 is configured to perform an electrolysis process that splits a carbon-containing gas within a molten electrolyte. The product of that splitting is a CNM product with bulk or residual electrolyte there within, namely a carbanogel that may also be referred to as a carbanogel product.

The vessel 212 that receives the carbanogel (as shown by line X in FIG. 2), whether as a cool product or hot product. The vessel 212 can be made of various materials and be of any shape and dimension, provided that the vessel 212 is robust enough to withstand the temperatures of the carbanogel received there within.

The system 200 may further include an isolation unit 224 for protecting the polymer-CNM admix 222 from an oxidative environment. The isolation unit 224 may include a fluid tight vessel that is of suitable dimensions to receive the polymer-CNM admix 222 and to remove any oxidative agents, such as oxygen containing gas, from within the vessel, for example by vacuum pump, and to replace and fluids within the vessel with a non-oxygen containing gas, such as an inert gas.

The source of a monomer/polymer mix 214 may be vessel that houses the monomer/polymer mix and/or the source 214 may comprise a preparation unit for preparing the monomer/polymer mix. For the purpose of this disclosure, the term "polymer mix" is used interchangeably with the terms "polymer mix", "monomer/polymer mix" and "monomer/polymer mixture" to refer to a mix of a polymer, a homopolymer, a heteropolymer, at least two polymers, a monomer, at least two monomers or any combination thereof where the polymer mix is capable of being employed in the embodiments of the present disclosure for making the polymer-CNM admix. For example, the preparation unit may comprise a reaction vessel in which one or more chemical reactions can be performed. Non-limiting examples of such chemical reactions that can be performed in the reaction vessel include, but are not limited to: an initiation reaction, a propagation reaction, a termination reaction, a condensation reaction, a ring opening reaction, an ionic reaction, a chain transfer reaction, a photon-based reaction, a thermal reaction, a plasma polymerization reaction or any combination thereof.

Additionally or alternatively, the preparation unit may comprise an extruder for applying a predetermined heat and pressure to an extruder input for producing the monomer/polymer mix.

The source of the monomer/polymer mix 214 may include monomer precursors that may require being combined with the carbanogel prior to being prepared into a polymer in order to produce the polymer-CNM admix. Additionally or alternatively, the monomer/polymer mix 214 may include already prepared polymer that is capable of being combined with the carbanogel for producing the polymer-CNM admix.

In some embodiments of the present disclosure, the source 214 is a source of a natural polymer, a synthetic polymer, a semisynthetic polymer, a regenerated polymer, an amorphous polymer, a semi-crystalline polymer, a thermoset polymer, a thermoset polymer, a thermoplastic polymer, a monomer precursor of such polymers or any combination thereof.

In some embodiments of the present disclosure, the source 214 is a source of PLA, PVA, PP, PE, acrylic, ABS, anylon, Teflon, PC, an epoxy, an epoxy, an acrylic, a phenolic, a polysiloxane, a polyurethane, a polyimide, a vulcanized rubber, a Bakelite, a pDCPD, a polyisocyanurate, a polyester, a polyurea, a urea-formaldehyde, a vinyl ester, a cyanate, a melamine, a polyester resin, a monomer precursor of such polymers or any combination thereof.

In some embodiments of the present disclosure, the system 200 may further include a processing unit 216 for crushing a cooled or hot carbanogel product prior to (or following) being received by the vessel 212. The processing unit 216 can be various suitable components, mechanisms or machines that can withstand the temperatures of the carbanogel, such as but not limited to: a grinder; a mincing unit; a physical press; a pulverizing unit; a mill or any combinations thereof. The resulting particle size of the carbanogel is determined by the extent of the processing operation performed by the processing unit 216.

In some embodiments of the present disclosure, the system 200 may further comprise an electrolyte reducing unit 218. The electrolyte reducing unit 218 can receive the carbanogel product, cooled or hot, directly from the apparatus 210 and/or it may receive the processed carbanogel product from the processing unit 216. The electrolyte reducing unit 218 reduces the electrolyte content of the carbanogel product (processed or unprocessed) so that the reduced electrolyte content carbanogel can be processed (or further processed) in the processing unit 216 and then received in the vessel 212. Alternatively or additionally, the reduced electrolyte content carbanogel can be received in the vessel 212 from the electrolyte reducing unit 218.

The electrolyte reducing unit 218 can reduce the electrolyte content of the carbanogel (processed or unprocessed) by mechanical approaches, chemical approaches, electrochemical approaches or any combination thereof. For example, the mechanical approaches may include various suitable components, mechanisms or machines that can reduce the electrolyte content of the carbanogel, such as a mechanical press that pushes the carbanogel through a mesh, or a sieve, a heater for melting the electrolyte within the carbanogel, a filter (room temperature or high temperature) or any combination thereof. The chemical approaches for reducing the electrolyte content of the carbanogel include one or more washing stations for exposing the carbanogel to one or more chemicals that can dissolve the electrolyte. In addition to reducing the electrolyte content the one or more chemicals may also be applied to dissolve impurities, such as amorphous carbons or metals, from the CNM within the carbanogel. The electrochemical approaches include apparatus for performing selective electrolysis for reducing the electrolyte content and/or impurity content of the carbanogel.

In some embodiments of the present disclosure, the system 200 may further include an alignment unit 220 that aligns at least a portion of the CNM components in the carbanogel (processed and/or electrolyte reduced or not) and/or the polymer-CNM admix (as shown in the non-limiting example of FIG. 2). The alignment unit 220 may be integrated into the vessel 212 such that the alignment procedure performed by the alignment unit 220 occurs within the vessel 212. Alternatively or additionally, the alignment unit 220 may be a separate physical component from the vessel 212 that can receive uncompressed carbanogel (processed and/or electrolyte reduced or not), perform the alignment procedure and then transfer the aligned carbanogel to the vessel 212. The alignment unit 220 may employ one or more of a mechanical approach, an electric approach, a magnetic approach or any combination thereof so that the aligned CMN components within the polymer-CNM admix have desired anisotropic properties. The alignment unit 220 may employ a mechanical approach by various suitable components, mechanisms or machines can apply an orienting physical stress field to the CNMs within the carbanogel (processed and/or electrolyte reduced or not) and/or within the polymer-CNM admix. For example, the mechanical approach can apply a shear force to the CNM product within the carbanogel. The shear force can be applied by pulling, spinning or dragging a body, such as a piston, through the CNMs within the carbanogel (processed and/or electrolyte reduced or not) and/or within the polymer-CNM admix. Alternatively, the shear force can be directionally applied to increase CNM entanglement rather than CNM alignment.

The alignment unit 220 may employ an electrical approach by various suitable components, mechanisms or machines that can apply an orienting electrical field to the CNMs within the carbanogel (processed and/or electrolyte reduced or not) and/or within the polymer-CNM admix.

The alignment unit 220 may employ magnetic approach by various suitable components, mechanisms or machines that can apply an orienting magnetic field to the CNMs within the carbanogel (processed and/or electrolyte reduced or not) and/or within the polymer-CNM admix.

In some embodiments of the present disclosure, the alignment unit 220 may be used to decrease rather than increase the directional alignment of the CNM and, therefore, a decrease in any anisotropic properties of the polymer-CNM admix.

Figure 3:
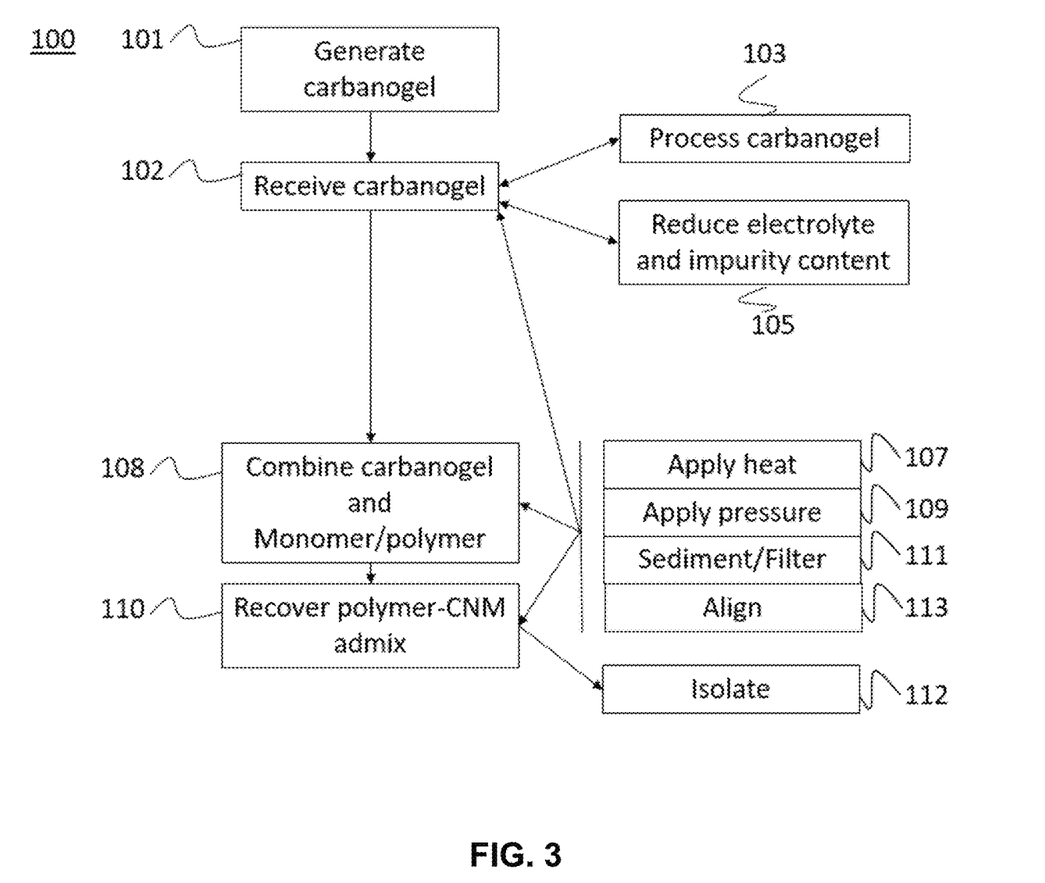
FIG. 3 is a schematic that represents steps of a method according to embodiments of the present disclosure.

FIG. 3 shows the steps of a method 100 for making a polymer-CNM admix, as comprising the steps of receiving 102 a carbanogel, combining 108 the carbanogel and the monomer/polymer mix in a vessel, and recovering 110 the polymer-CNM admix. Optionally, the method 100 may further comprise a step of generating 101 the carbanogel by the electrolysis process described herein above. The method 100 may further comprise a step of processing 103 and/or reducing 105 the electrolyte content of the carbanogel.

For the step of receiving 102, the carbanogel may be generated using the electrolysis process described herein above, this may be referred to as the step of generating 101. The generated carbanogel contains the tangled product of the CNM grown on the cathode during the molten electrolytic splitting of $CO_2$. By selectively controlling the operational parameters of the generating step 101, electrolysis process described above, the generated carbanogel can have a greater relative amount of a desired morphology of the CNM within the carbanogel. For example, the electrolysis process can be controlled to increase the relative amounts of spherical nanocarbon, solid and hollow nano-onions, nanocarbon of cylindrical allotropes, planar allotropes, helical allotropes, carbon nanotubes (CNTs), nanofibers, graphene, nano-platelets, nano-scaffolds, nano-trees, nano-belts, nano-flowers, nano-dragon, nano-trees, nano-rods, surface modified or metal coated CNMs, amorphous nanocarbon without graphitic characteristics or properties, or any combination thereof as compared to other morphologies of nanocarbon structures within the CNM of the carbanogel.

The generated carbanogel that contains the CNM product may be received in a step of carbanogel processing 103 that includes allowing the carbanogel to cool, peeling, or breaking off pieces of the carbanogel from the cooled cathode 18, crushing the carbanogel, or any combination thereof. Alternatively, in the step of processing 103, the carbanogel that contains the CNM product can be extracted while still hot from the cathode 18 and containing hot molten electrolyte and then subjecting the hot carbanogel to crushing or other steps of the methods described herein. As such, the step of receiving 102 may be of cooled and solid or hot and thick, fluid carbanogel, which may have been subjected to further processing, or not.

According to the embodiments of the present disclosure, the step of processing 103 can be performed by various approaches such as crushing techniques including, but not limited to: grinding; mincing; pressing; pulverizing; milling or combinations thereof. The resulting particle size of the carbanogel material within the carbanogel is determined by the extent of the crushing. Further and/or more rigorous crushing will result in a smaller carbanogel particle size, which may influence the combining of the polymer mix and the carbanogel as compared to the scenario where the step of processing 103 is performed for a shorter amount of time and/or with less rigor.

In some embodiments of the present disclosure, the electrolyte and/or impurity content of the carbanogels can be reduced by the step of reducing 105. Without being limited, the reduced impurities may include non-graphitic carbons, such as amorphous carbon and metals, or a combination thereof. Some, most, substantially all or all of the electrolyte and or the impurities can be removed from the carbanogel by pressing, reacting or washing the carbanogel with chemical, mechanical or electrochemical approaches. For example, mechanical approaches for the reducing step 105 may include applying physical pressure to the carbanogel to mechanically force electrolyte out of the carbanogel through a sorting device such as a mesh with specific pore sizes. Mechanical approaches may also include regulating temperatures above the melting point of the electrolyte to facilitate electrolyte flow and separation. The melting point of alkali and alkali earth carbonate electrolytes range from less than 400° C. for molten eutectic ternary Li, Na, K carbonate to 891° C. for potassium carbonate. The applied pressure can range from 0 up to 1000 pounds per square inch (psi), 1000 up to 2000 psi, or 2000 or greater psi. Alternatively or additionally, the reducing 105 may include a chemical approach whereby the carbanogel is exposed to one or more chemicals to cause a reaction whereby the electrolyte content of the carbanogel is reduced. For example, a washing liquid can be used to wash the carbanogel, where the washing liquid can dissolve a portion of the residual, or bulk, electrolyte from the carbanogel particles. The washing liquid can include neutral pH liquids such as water or aqueous salt solutions, or acidic or alkaline solutions which can promote dissolution of the molten electrolyte, such as formic or hydrochloric acid, or ammonia sulfate, oxidizing solutions, such as permanganate or peroxide, or organic solvents, or any combination thereof. In addition to reducing the electrolyte the washing liquid can be applied to dissolve impurities, such as amorphous carbons or metals, from the CNM. In some embodiments of the present disclosure, electrolyte content of the carbanogel can be reduced by room temperature filtration and/or high temperature filtration. Further approaches for reducing 105 the electrolyte content of the carbanogel include, but are not limited to: mechanical approaches like sieving and filtering; electrochemical means, such as selective electrolysis; thermal means, such as oxidative removal by combustion of less stable amorphous carbons can also be applied to remove CNM impurities; or any combination thereof. Reducing the electrolyte content of the carbanogel may increase the relative proportion of CNMs in the carbanogel. In some embodiments of the present disclosure, the step of reducing 105 the electrolyte and/or impurity content of the carbanogel can be performed one or more times on the processed or unprocessed carbanogel.

In one embodiment of the present disclosure, the carbanogel (processed and/or electrolyte content reduced, or not) is combined with the polymer mixture in a single step to form the polymer-CNM admix. In another embodiment, the carbanogel (processed and/or electrolyte content reduced, or not) is added during preparation of the polymer for example during an initiation step, and/or a propagation step and/or a termination step of preparing the polymer. In another embodiment, the carbanogel (processed and/or electrolyte content reduced, or not) is added during a step of preparing the polymer where a condensation reaction/mechanism occurs, a ring opening reaction/mechanism occurs, an ionic reaction/mechanism occurs, a chain transfer reaction/mechanism occurs, a photon based reaction/mechanism occurs, a thermal reaction/mechanism occurs, a chemical reaction/mechanism occurs, a plasma polymerization reaction/mechanism occurs or combinations thereof.

In some embodiments of the present disclosure, the carbanogel (processed and/or electrolyte content reduced, or not) is added during the preparation of a natural, synthetic, semisynthetic or regenerated polymer. In another embodiment of the present disclosure, the carbanogel (processed and/or electrolyte content reduced, or not) is added during the preparation of a thermoplastic polymer or a thermoset polymer. In another embodiment of the present disclosure, the carbanogel (processed and/or electrolyte content reduced, or not) is added during the formation of an amorphous polymer or a semi-crystalline polymer.

Without being bound by any particular theory, the inventors theorized that fused residual electrolyte in the processed carbanogel particles provides a driving force for homogeneous dispersion of the CNMs that—after combining—results in assembly of the processed carbanogel particles into the polymer-CNM admix without requiring sonication or other more rigorous mixing processes. Carbanogels prepared during the electrolytic process for splitting $CO_2$, include both CNM and electrolyte and this combined presence may provide a fixed structure that is effectively a lattice matrix of "pre-dispersed" CNM.

Example 1: Carbanogel PLA Polymer-CNT Formation Conditions by Polymerization

Some embodiments of the present disclosure relate to a system that may be used to perform a method for preparing a polymer-CNT admix in which the polymer mix comprises PLA. During this method, the carbanogel is processed by crushing to form carbanogel particles that are added prior to the polymerization step, which then proceeds to form the admix of PLA polymer and the CNM of the crushed carbanogel. The conventional polymerization preparation of PLA proceeds by one of two pathways either condensation (also termed direct) polymerization or ring opening condensation polymerization (also termed open-loop). For example, an aqueous lactic acid solution can be heated and vacuum pumped to remove water, alone or in the presence of a catalyst. Once the reaction is complete or nearly complete, liquid PLA (which melts at about 130-180° C.) can be poured off, or stored for later use as a solid. Either PLA preparation pathway can provide for crushed carbanogel initiation, and/or propagation and/or termination stages of PLA formation, for example adding the CNM (of the crushed carbanogel) to form a PLA-CNM admix.

Figure 6:
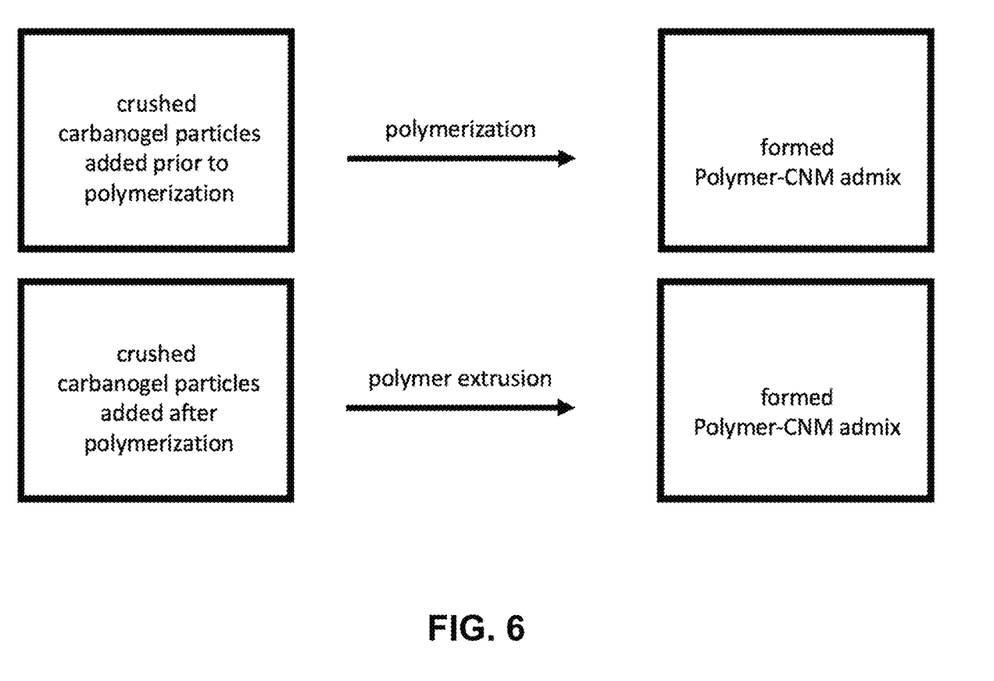
FIG. 6 has two panels that show a schematic of further protocols for making a polymer-CNM admix, according to the embodiments of the present disclosure, wherein the upper panel shows a protocol where the combining step occurs prior to preparing the polymer and the lower panel shows a protocol where the combining step occurs subsequent to preparing the polymer.

CNTs are the strongest material known and considerably enhance the strength of PLA-CNT admix, as compared to PLA alone. In general, CNTs have not been added to thermoplastics prior to polymerization, and have been added with sonication and/or dissolved thermoplastic solvent mixtures to allow for a homogeneous dispersion of the CNTs or added with extensive mixing during melting prior to extrusion. Instead, and as one example to this embodiment, CNTs are added as crushed polycarboxylate and polycarboxylate salts, which are compatible with PLAs. Aqueous poly carboxylate superplasticizers, including but not limited to various superplasticizers (for example, those commercially available from Adva, Plastol and BASF and other plasticizers) are excellent carbanogel CNM dispersants with conventional mixing, rather than sonication, result in a substantially homogenous dispersion of the crushed carbanogel/polycarboxylate within the PLA polymer admix. Hence, the addition of both crushed carbanogels and polycarboxylates prior to PLA polymerization and without energy wasting sonication, provides dispersed CNMs early and throughout the PLA formation process. In some embodiments of the present disclosure, the crushed carbanogels and/or the polycarboxylate are added subsequent to the polymerization process and then the PLA polymer, the crushed carbanogels and/or the polycarboxylate are subjected to an extrusion process to provides a substantially homogeneous dispersion of the CNMs throughout the PLA polymer. These alternative crushed contiguous polymer-CNM admix formation protocols are shown in FIG. 6.

Example 2: Carbanogel PLA Polymer-CNT Formation Conditions by Extrusion

In a further embodiment of the present disclosure, the polymer-CNM admixes are prepared using crushed carbanogel particles instead of conventional dispersed CNMs during the polymer extrusion step. The extrusion may utilize a blend of processed carbanogel with either a solid polymer or a melted polymer. This embodiment is compared to a conventional process of PLA-CNT admix preparation. In a conventional process, 0, 2, 4, 6, or 8 wt % CNTs are mixed by blending with PLA pellets for 8 hours. Sonication without a liquid to convey the sonic energy is not possible in this media. The extended mixing time by blending is an attempt to achieve a homogenous dispersion despite the lack of sonication. The known extrusion process uses a double screw extruder followed by a single screw extruder at temperatures, which increase from 165° C. to 220° C. to form the known PLA/CNT admix for testing. The 6 wt % CNT addition exhibited the largest strength increase. Compared to the PLA with 0% CNT, the 6 wt % PLA/CNT admix produced a 64% increase in tensile strength and a 29% increase in flexural strength. Instead of a conventional CNT, in this embodiment of the present disclosure the processed carbanogel, is added along with the PLA during blending for extrusion. Hence, a comparable PLA-CNT strength increase can be achieved with substantially the same amount of CNT loading, using a much lower blending time, such as less than 1 hour. Mixing of a melted polymer with a carbanogel, according to embodiments of the present disclosure, yields a significant increase in the associated storage modulus.

Example 3: Thermoset Plastic-Carbanogel Admixes

This example relates to forming a polymer-CNM admix through combining processed carbanogels with a thermoset plastic, which generally cannot be melted and reformed, such as epoxy. The processed carbanogel may be crushed carbanogel and provided an improved dispersion and interaction with the polymer. For example, in one type of conventional epoxy-CNT admix, the CNTs (as opposed to a carbanogel) are homogeneously dispersed and then covalently attached to the epoxide (O ringed or bonded to two C's) containing component, via an amine link, followed reaction of the epoxide group to form the epoxy-CNT admix. In some embodiments of the present disclosure, the crushed carbanogel is dispersed by mixing in a solvent that is a compatible medium to cause a defect, graft and/or covalently attach the CNM to the epoxide (O bonded to two C's) via a functionalized moiety. This mixing is followed by reacting the epoxide, such as via a chemical reaction (including polyamine, polyamide, alkali, or anhydride mediated reaction), thermal-based hardener or a photon-based hardeners to open the oxygen ring and form the epoxy-CNM admix formed from the crushed carbanogel, rather than a conventional CNT.

Further embodiments of the present disclosure utilize a mix of the CNM with the polymer. This is achieved by dispersing the CNM in the polymer mixture, but here is achieved by direct mixing of the crushed carbanogel in the polymer mix. Conventional dispersion of the CNM in the mix is achieved by shear mixing either mechanical or magnetic, calendaring, extrusion, ball milling, or ultrasonication, or a combination thereof, and has been used with direct dipping or indirect integration to enhance textiles.

Example 4: Increased Tensile Strength of Epoxy-CNM Admix

Figure 4:
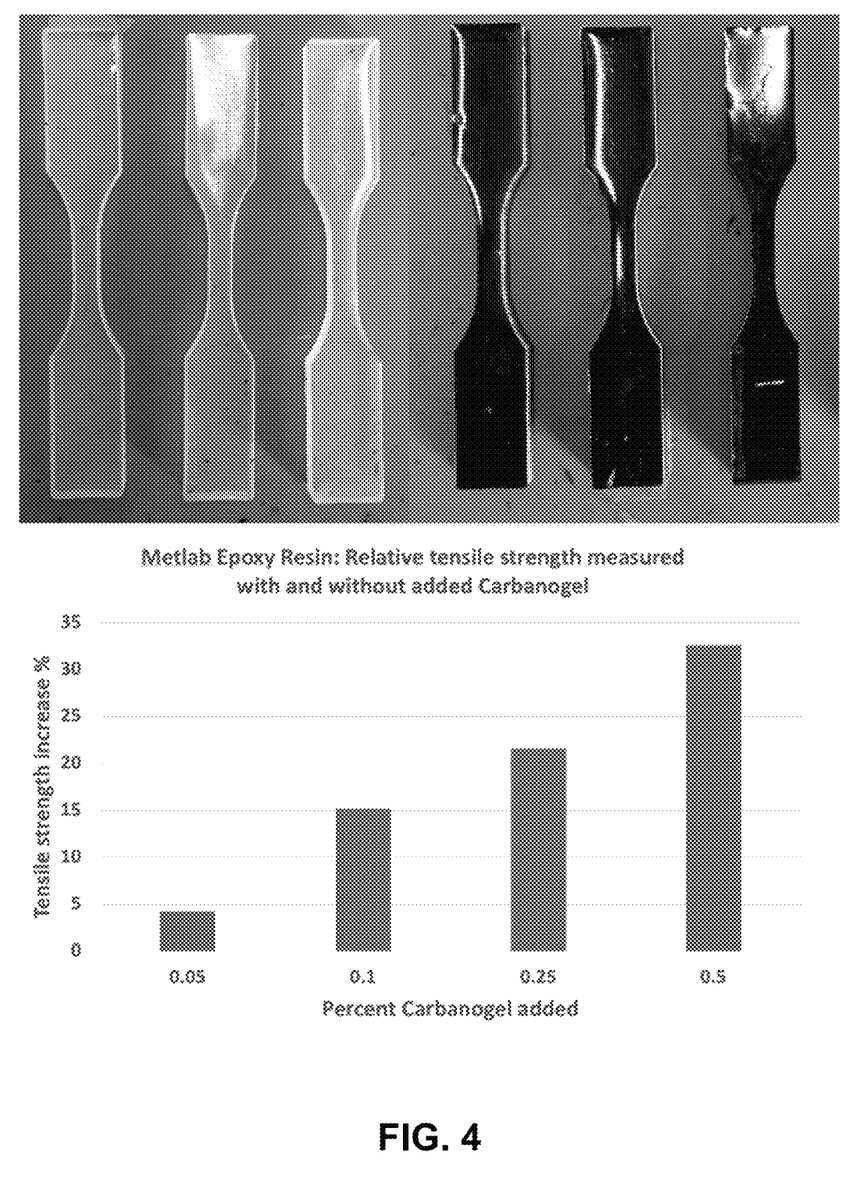
FIG. 4 has two panels that show properties of embodiments of the present disclosure, wherein the upper panel shows photographs of epoxy resin articles made with and without carbanogel and the lower panel is a bar graph that shows the increased tensile strength relative to percent weight addition of carbanogel.

FIG. 4 shows photographs and tensile strength date from an example of an epoxy resin with and without added carbanogel made from $CO_2$, according to embodiments of the present disclosure. The upper panel of FIG. 4 shows three articles made without carbanogel (three dog bone shaped articles on the left hand side) and three articles made with carbanogel, according to the embodiments of the present disclosure, the carbanogel articles (three dog bone shaped articles on the right hand side). The carbanogel articles were entirely black and the photographs were lightened to highlight contrast. The carbanogel used to make the carbanogel articles was made using an electrolysis process, as described herein, to transform $CO_2$ into carbanogel. The carbanogel was made in the apparatus 10 using a steel stainless case 304 in a 750° C. $Li_2CO_3$ molten electrolyte with a Muntz brass cathode and a stainless steel 304 anode producing a CNT carbanogel product. The carbanogel was also made from $CO_2$ to make a CNT carbanogel product when the cathode was changed to Monel or Ni alloys, including Inconels, Nichromes and Ni-iron and Ni-copper alloys, and the anode was changed to Inconels, Nichromes and Ni-iron and Ni-copper alloys. This carbanogel product was cleaned with hydrochloric acid (HCl). About 4 parts of Metlab M135 resin and about 1 part of Metlab M135 hardener were degassed separately inside a vacuum chamber at 60° C. Afterwards, the desired 0%, 0.05%, 0.1% 0.25% or 0.5% by weight carbanogel, reduced of electrolyte, containing purified CNT (as compared to the total weight of resin and hardener) was added to the resin and then mixed for 4 min at 65 rpm, then sonicated for 15 min. After sonication, hardener was added, mixed at 65 rpm for 4 min, and then degassed. Samples were cured at 60 C.° for in conventional "dog bone" molds and removed for tensile strength testing. The top panel of FIG. 4 shows three cured control samples without added Carbanogel on the top left, and three cured samples with 0.5 wt % Carbanogel on the top right. Tensile strength relative to the control samples was measured with an ETM-10kN Computer Controlled Electronic Universal Testing Production Machine. The lower panel of FIG. 4 shows the observed increase in tensile strength, as compared to the tensile strength of the articles without the added carbanogel. The lower panel in FIG. 4 shows that the samples with 0.05, 0.1, 0.25 and 0.5% wt % carbanogel respectively exhibited 4, 15, 21 and 33% relative increases in measured tensile strength.

Example 5: Polymer-CNM Admixes Alone and in Conjunction with Alternate Layers

The polymer-CNM admix may be used alone in a material or product such as in a planar liner, a heat retardant, or heat shield. The polymer-CNM admix may also be used in combination, such as but not limited to laminates, with another material that are not made from the polymer-CNM admix, where the polymer-CNM admix imparts new or improved properties to those other materials. For example, the polymer-CNM admix and its composites have displayed a shape memory property under various activation conditions such as thermal activation, mechanical activation, electrical activation, magnetic activation, photo-activation or chemical activation. This shape memory property can be incorporated into the polymer-CNM admix, a material or product made therefrom and a material or product made from combining the polymer-CNM admix (or material or product thereof) and another material. Note, that in addition to the shape-memory property, when epoxy is used as the polymer in the polymer-NCM admix, there may be an increased tensile strength of up to 184% and an impact strength increase of up to 444% with the addition of 0.1 to 1 wt % when the CNM comprises multi-walled CNTs, which arises by selecting the operating conditions of the electrolysis process. Furthermore, when the operating conditions of the electrolysis process are selected to increase the relative amount of coiled CNTs within the CNM there may be an enhanced spring-effect. These shape memory properties may also be promoted by incorporating anisotropic properties in the polymer-CNM admix by aligning, as described above. The electrical and thermal conductivity of CNMs, such as graphene, may present superior properties for their applications as polymer heating elements or radiators. Incorporating shape-memory properties and heating element behavior may be useful each alone or in combination with layers of another material.

Figure 5:
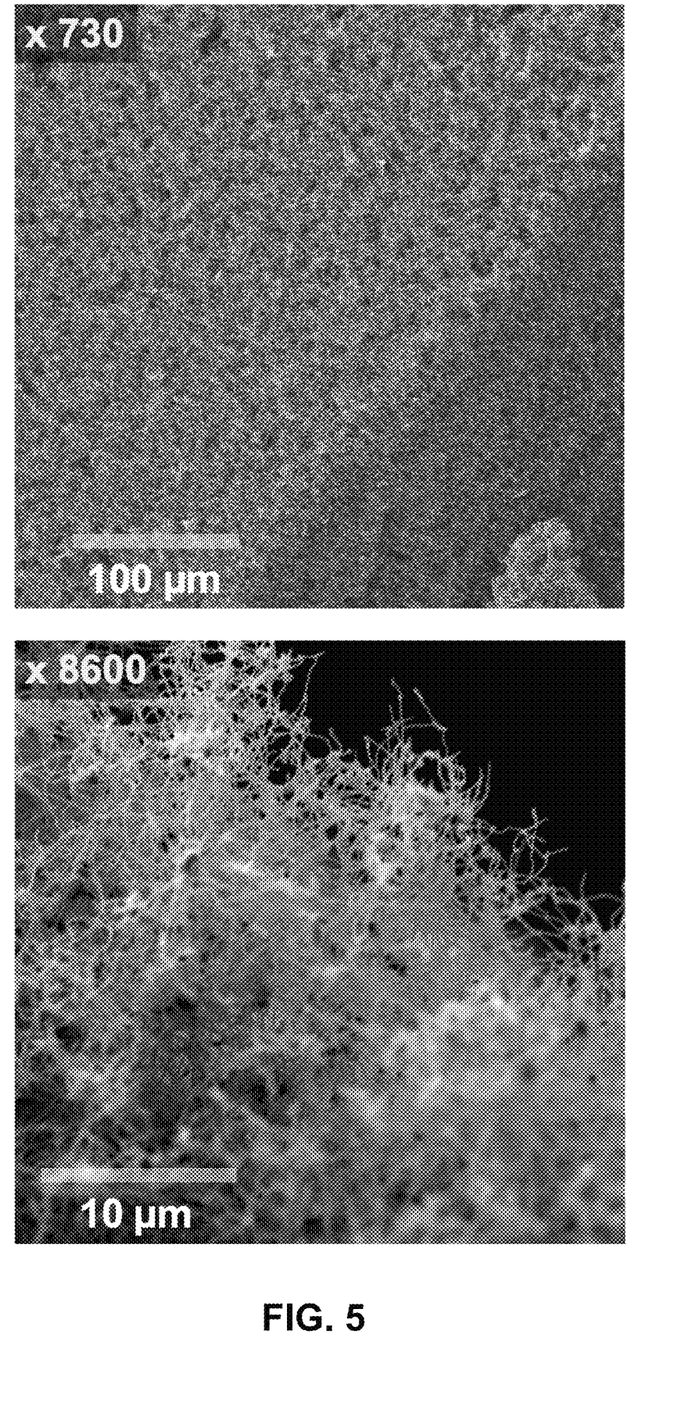

FIG. 5 is an example of carbanogel with electrolyte reduced by washing, and is shown at two different magnifications of ×720 and ×8600 as measured by scanning electron microscopy, SEM. This example is of a CNT carbanogel as prepared by $CO_2$ electrolysis in the previous examples. The large particle size of the intermingled CNMs comprising the carbanogel is evident in the upper panel of FIG. 5. This is large compared to the conventional filtration medium porosity and provides the unusual opportunity for the nano-dimensioned CNMs to be handled macroscopically for admixture to polymers. In addition to the advantage of being formed from $CO_2$, rather than high carbon footprint reactants, this allows the carbanogel to be readily formed from microscopic restraining filters despite the nanomaterial dimensions of the carbanogel materials, as shown in the lower panel of FIG. 5. Subsequent to the electrolysis, the carbanogel was processed by being peeled from the cooled cathode and broken up. The processed carbanogel is shown in the SEM image of FIG. 5 subsequent to washing with concentrated HCl. The high purity of the CNTs and their orientation in a diverse range of directions is also evident in FIG. 5. An alternate wash with dilute HCl acid similarly washed out electrolyte and metal impurities as measured by electron dispersive spectroscopy (EDS) and thermal gravimetric analysis (TGA). An alternative wash with either water or formic acid or ammonium sulfate mainly removed the excess electrolyte, and not any metal impurities. Another alternative wash combining hydrochloric acid and hydrogen peroxide, in this case, sonicating, rather than mixing the carbanogel in a solution of concentrated HCl and 35% $H_2O_2$, removed excess electrolyte, metal impurities, and in addition amorphous carbon impurities. Similarly, other chemical oxidizers, such as hydrochloric acid and potassium permanganate, were observed to be effective with adequate dilution, as have electrochemically generated oxidizers. As measured with TGA, amorphous carbon has a lower combustion temperature as compared to carbon nanotubes and amorphous carbon is more prone to oxidation than the more robust graphitic nanocarbon structures, such as layered graphene CNT structure. Therefore, amorphous carbon may be removed as an impurity by chemical oxidation, electrochemical oxidation, thermal oxidation or any combination thereof. As a further example, heating the carbanogel to 300° C. after HCl wash reducing the impurity content of carbanogel. The reduced impurity content was measured by an observed decreased mass of the carbanogel after the impurity reducing steps and by TGA and SEM. TGA data indicated that the HCl and heating steps of reducing largely removed the amorphous carbon impurity, and the SEM analysis indicated that the carbanogel with the reduced impurity content retained CNTs.

Without being bound by any particular theory, the polymer-CNM admixes of the present disclosure may be used in polymer material and polymer product applications while increasing the environmental sustainability of such polymer materials and polymer products made therefrom by: (i) reducing the input materials required to make the polymer material or polymer product because the carbanogel content will impart enhanced strength and/or conductivity; (ii) allowing the polymer materials and polymer products to last longer through enhanced chemical, mechanical, photo, and thermal resistance while still being as easily recyclable as currently available polymer materials and products that are made without carbanogel of the current disclosure; (iii) replacing less environmentally friendly polymers, such as polyethylene, with the polymer-CNM admix of the present disclosure, such as PLA-CNM admixes; (iv) such polymer material and polymer product applications acting as a carbon sequestration reservoir, or any combination thereof.

The CNM-polymer admix made according to the embodiments of the present disclosure may be used in various material and product applications such as, but not limited to: in liners, heat retardants, or shields. However, the polymer-CNM admix, materials and products made therefrom, according to the embodiments of the present disclosure, may also be used as a component in a composite material such as, but not limited to, a laminate that incorporates at least one layer made from the polymer-CNM admix with other non-CNM materials to impart improved properties to those other non-polymer materials. Furthermore, polymers made from the polymer-CNM admix and composites made with such polymers (that include CNM) have displayed a shape memory property under thermal, mechanical, electrical, magnetic, light or chemical activation conditions, and these properties can be imparted into materials or products that incorporate (by being impregnated or reinforced with or otherwise integrate) such CNM including polymers. This shape memory effect is promoted by the incorporation of anisotropic properties in the polymer made from the polymer-CNM admix, as described above. Furthermore, the electrical and thermal conductivity of the CNM-polymer product may provide superior properties when used in a heating element or radiator application.

Other applications of the materials and products made from the polymer-CNM admix of the present disclosure that can make use of the superior CNM properties imparted by the carbanogel include, but are not limited to: (i) lightweight tooling applications for high speed, safety, and quick changes; (ii) tools that are harder for better drilling, impact, and/or sawing; (iii) tools with better thermal management; (iv) ultra-strong, foldable materials; (v) general sequestering of $CO_2$; (vi) an ultra-light, ultra-absorbent sponge; (vii) as a pre-made laminate sheet for including in a composite; (viii) for ballistic or electromagnetic field (EMF) shielding; (ix) parachutes and drag enhancers; (x) knittable/sew-able polymers for textile/fabrics; or (xi) fibers/filaments for 3-D manufacturing or printing.

Other uses of materials and products made using the polymer-CNM admix, according to the embodiments of the present disclosure, include products that combine the advantage of two or more superior CNM-based properties such as: structural materials that provide dual usage additionally reducing weight, material costs/used, and/or increasing capacity. Some non-limiting examples of such dual uses include: (i) use of strength properties for structural purposes and use of electrical-energy storage properties; (ii) use of strength properties for structural purposes structure and use of thermal-energy storage properties; (iii) use of strength properties for structural purposes use as an electrical conduit or wire; (iv) use of strength properties for structural purposes and use as a sensor to collect real-time strain or safety data to assess the material's performance; (v) use of strength properties for structural purposes and use as a catalyst; (vi) use of strength properties for structural purposes and use as a thermal conduit, or any combination thereof. Also, there are applications and uses of materials and products made using the polymer-CNM admix, according to the embodiments of the present disclosure, for increasing safety by being used in a heat dispersing member for dispersing high heat, such as in applications where fire is a concern.

I claim:
1. A system for making a polymer-CNM admixture, the system comprising:
 (a) an apparatus for performing an electrolysis process that splits carbon dioxide ($CO_2$) within a molten elec- trolyte for producing a carbanogel, wherein the carbanogel comprises carbon nanomaterials (CNM) and electrolyte;

(b) a source of a polymer mixture.

2. The system of claim 1, further comprising a processing unit.

3. The system of claim 1, further comprising an electrolyte reducing unit.

4. The system of claim 1, further comprising an alignment unit.

5. The system of claim 1, further comprising an isolation unit.

6. The system of claim 1, wherein the electrolyte has been partially removed from the carboanogel.

7. The system of claim 6, wherein the electrolyte has been removed by pressing, reacting or washing.

8. The system of claim 1, wherein the carbanogel has been subject to crushing, cooling, peeling, breaking, grinding; mincing; pressing; pulverizing; milling or combinations thereof.

9. The system of claim 1, wherein the polymer-CNM admixture is used in conjunction with a layer of another non-CNM material.

10. The system of claim 1, wherein the polymer-CNM admixture is a shape memory material.

11. The system of claim 10, wherein a shape memory property of the polymer-CNM admixture is activated electrically, magnetically, chemically, thermally, by light or any combination thereof.

12. The system of claim 1, wherein the polymer-CNM admixture is used as a heating element.

13. A method to use a polymer-CNM admix made by the system of claim 1 in manufacturing a material, wherein the polymer-CNM admix; increases an environmental sustainability of the material by reducing an amount of input material needed to manufacture the material; strengthens the material; increases an electrical conductivity of the material; increases a lifetime of the material by enhancing the material's chemical durability, mechanical durability, photo durability, thermal durability, or any combination thereof.

14. A carbon sequestration reservoir at least partially manufactured using a polymer-CMN admix, wherein the polymer-CMN admix is formed by the system as defied in claim 1.

15. A method to use a polymer-CNM admix made by the system of claim 1, in manufacturing: (i) light-weight tooling for high speed, safety, and quick change applications; (ii) a tool for drilling, impacting, and/or sawing; (iii) a tool with enhanced thermal conductivity or enhanced thermal insulation; (iv) an ultra-strong and foldable material; (v) a material for sequestering of carbon dioxide; (vi) an ultra-light, ultra-absorbent sponge; (vii) a pre-formed laminate sheet for incorporation into a composite; (viii) a shielding material for ballistic or electromagnetic field (EMF) shielding; (ix) a parachute or drag enhancer; (x) a knittable/sewable polymer for making a textile; (xi) a fibers or filament for three dimensional manufacturing or printing or any combination thereof.

16. A material at least partially formed from a polymer-CNM admix, wherein the polymer-CNM admix is made using the system of claim 1, wherein the material comprises at least one of: (i) strength properties for structural purposes and electrical-energy storage properties; (ii) strength properties for structural purposes structure and thermal-energy storage properties;

(iii) strength properties for structural purposes and as an electrical conduit or wire; (iv) strength properties for structural purposes and as a sensor to collect real-time strain or safety data to assess the material's performance; (v) strength properties for structural purposes and as a catalyst; and (vi) strength properties for structural purposes and as a thermal conduit.

* * * * *